United States Patent [19]
Ricci

[11] Patent Number: 5,189,933
[45] Date of Patent: Mar. 2, 1993

[54] CLAMSHELL MOUNTED PIPE NOZZLE WELD MILLING MACHINE WITH CENTERING APPARATUS

[76] Inventor: Donato L. Ricci, Rte. 1, Box 1067, Hager City, Wis. 54014

[21] Appl. No.: 681,961

[22] Filed: Apr. 8, 1991

[51] Int. Cl.$^5$ ............................................... B23B 3/26
[52] U.S. Cl. .................................. 82/113; 82/11.2; 30/97
[58] Field of Search .................. 82/113, 11.2, 17, 19, 82/46, 48, 54, 70.1, 70.2, 84, 88, 92, 98; 30/97; 409/179, 182; 414/736; 901/29

[56] References Cited
U.S. PATENT DOCUMENTS

| | | | |
|---|---|---|---|
| 2,769,234 | 11/1956 | Young | 30/97 |
| 2,842,238 | 7/1958 | Shaw et al. | 409/179 |
| 3,034,545 | 5/1962 | Vesely | 82/11.1 |
| 4,149,436 | 4/1979 | Blattler | 82/113 |
| 4,213,357 | 7/1980 | Lively et al. | 82/113 |
| 4,342,239 | 8/1982 | Feamster, III | 30/97 X |
| 4,739,685 | 4/1988 | Ricci | 82/113 |
| 4,776,749 | 10/1988 | Wanzenberg et al. | 414/736 X |
| 4,813,314 | 3/1989 | Kwech | 82/113 |
| 4,819,496 | 4/1989 | Shelef | 901/29 |
| 4,944,205 | 7/1990 | Ricci | 82/113 |

*Primary Examiner*—Z. R. Bilinsky
*Attorney, Agent, or Firm*—Haugen and Nikolai

[57] ABSTRACT

A portable lathe especially designed to remove overlay welds used as a temporary fix to slow the propagation of IGSCC at the joints between pipes and nozzles in nuclear boiling water reactor systems comprises a clamshell-type portable machining lathe having a tool translating mechanism affixed to the rotatable portion of the clamshell where the tool translating mechanism provides both radial and axial movement of the tool bit relative to the weld material to be removed. To accommodate an arcuate surface of the nozzles, the tool translating mechanism includes a cam track whose profile or contour parallels that of the surface from which the weld material is to be removed. Completing the assembly is a positioning device which allows the clamshell to be precisely positioned on the pipe where the central axis of the clamshell is coincident with the center line of the pipe on which it is mounted and the plane of the clamshell is perpendicular to the pipe.

17 Claims, 4 Drawing Sheets

CLAMSHELL MOUNTED PIPE NOZZLE WELD MILLING MACHINE WITH CENTERING APPARATUS

BACKGROUND OF THE INVENTION

I. Field of the Invention

This invention relates to apparatus for refurbishing arcuate surfaces, such as the overlay weld used in joining straight lengths of pipe to nozzles commonly found in nuclear boiling water reactor systems, and more particularly to a milling machine which can be rapidly and accurately put into position and which is capable of following the arcuate profile of the overlay weld to reduce the exposure time of workers to nuclear radiation.

II. Discussion of the Prior Art

Nuclear boiling water reactor systems incorporate stainless steel pipes having recirculating nozzle structures made from high carbon steel joined thereto where the nozzles are outwardly divergent and define an arcuate surface profile proximate their point of joinder. The nozzle is welded to the pipe at this location. Weld overlay is frequently used as a temporary fix for a condition referred to in the industry as intergranular stress corrosion cracking or IGSCC. Because of the high heat, radiation and fatigue environment found in nuclear boiling water reactors IGSCC often occurs at the weld interface. This condition must be remedied to avoid leakage of radioactive water. The eventual remedy involves removal of the cracked overlay weld material and subsequent replacement with new pipe and weld. The method of the prior art used to remove the overlay weld involved the use of abrasive grinding in a totally manual operation. Because the pipes and nozzles are within the dry well of the nuclear boiling water reactor, it is a high radiation environment and, hence, federal regulations permit only limited time exposure, necessitating a large crew. Moreover, the grinding operation generates airborne contamination in the form of radioactive metallic dust particles.

Therefore, a need exists for a machine which can be used to accurately and precisely remove an overlay weld having an arcuate profile and which minimizes the length and degree of exposure of the workmen to atomic radiation hazard.

In my earlier U.S. Pat. No. 4,739,685, I described a split frame clamshell-type portable machining lathe which is adapted to encircle a pipe and which is used to drive a tool bit in a circular orbital path about the pipe while advancing the tool bit in the radial direction. This allows a radial groove or cut to be made through the wall of the pipe. Because both the clamshell lathe and the tool advance mechanism are power driven, the only manual effort involved is the initial setup of the clamshell lathe on the pipe to be worked upon and its subsequent removal when the task has been completed. The machine of my aforereferenced patent greatly reduces the exposure time of operators to the radiation environment, especially when contrasted to earlier methods when pipes had to be cut to length using a hacksaw.

In accordance with the above-referenced patent and with my further U.S. Pat. No. 4,944,205, the tool bit is made to move only in the radial direction and, therefore, cannot effectively be used to remove an overlay weld which may extend five inches or more in the axial direction.

From the above, it can be seen that there is a need for a machine which may be rapidly mounted on a pipe and which can be used to machine off an arcuate overlay weld in a nuclear boiling water reactor with a minimum of human intervention. It is also desirable that this be accomplished without creating airborne radioactive metal particles (dust) which might later be spread by persons who are exposed to that dust and carry it on their clothing.

SUMMARY OF THE INVENTION

As will be explained hereinbelow, I have devised an attachment for a split-ring clamshell lathe that can effectively be used to remove overlay welds from arcuate surfaces with a minimum of human intervention. Specifically, I have devised a first attachment for use with a split-ring clamshell drive mechanism which facilitates the accurate positioning of the clamshell on the pipe such that the plane of the clamshell intersects the pipe precisely at 90 degrees and which is effective to prevent the clamshell from becoming misaligned or wobbling relative to the pipe as it is used. A second attachment for the split-ring clamshell drive mechanism includes a tool transport apparatus which provides for both radial (depth of cut) movement and axial movement. Moreover, the axial movement can accommodate an arcuate flared surface such as encountered at the junction between a pipe and a flared nozzle.

This is achieved by providing a split-ring clamshell of the type having an annular stationary member and an annular rotatable member encircling the pipe on which the overlay weld is present. To aid in centering and maintaining that clamshell device perpendicular to the center line of the pipe, a split collar is clamped about the pipe adjacent to the annular stationary member of the clamshell and that collar is provided with a plurality of regularly spaced, outwardly extending arms which each arm terminates in a U-shaped socket. Affixed to the stationary member of the clamshell itself is a corresponding plurality of gimbal blocks that have a spherical recess formed therein and a slot through the wall of the block leading to that spherical recess. A plurality of threaded rods, each having a ball member affixed to one end thereof and a threaded nut positioned thereon are secured to the gimbal blocks by having the ball member contained within the spherical recess thereof. The threaded nuts are dimensioned so as to fit into the U-shaped sockets of the radially extending arms on the collar. Once the collar is firmly clamped to the pipe and the threaded rods are swung so that the nuts thereon fit into the U-shaped sockets, the ends of the threaded rod may be rotated with a wrench to apply axially directed forces to the clamshell at several angular locations. Then, by providing a feeler probe on the rotatable portion of the clamshell for engaging markings preformed on the surface of the overlay weld, a frame of reference is provided allowing both perpendicular adjustment and concentric centering of the clamshell to be quickly made.

Attached to the rotatable member of the clamshell and extending in a direction opposite to the aforedescribed positioning mechanism is a device which permits the cutting bit to move both radially and axially. It comprises a stationary guide block means affixed to the rotatable member of the clamshell drive and which projects normally from the side surface thereof. This stationary guide block means includes a dove-tail groove which extends in the radial direction relative to the pipe on which the clamshell is mounted. A first lead screw is journaled for rotation in the stationary guide block means where the longitudinal axis of that first lead screw is oriented in the radial direction. A moveable guide block having a dove-tail projection thereon fits into the dove-tail guide groove in the stationary guide block and is operatively coupled to the first lead screw for reciprocal movement as the first lead screw is rotated. The moveable guide block also includes a cam track having an arcuate shape corresponding to the arcuate surface of the overlay weld to be removed.

Also affixed to the stationary guide block means is a tool block translating means which has an axial guide groove and a second lead screw journaled for rotation therein along an axis which is parallel to the axially extending guide groove. The lead screw is operatively coupled to a tool block slide which has a dove-tail projection fitted into the dove-tail groove of the tool block translating means such that when the lead screw rotates, the tool block slide moves in the axial direction.

The tool block slide also incorporates a radial guide groove for accommodating a mating guide projection on a tool bit clamping means. The tool bit clamping means supports a cutting bit therein and has a cam follower joined to it for engaging the cam track on the movable guide block whereby axial movement of the tool block slide means causes the cutting bit to follow the contour of the cam track which, as mentioned, corresponds to the contour of the overlay weld.

DESCRIPTION OF THE DRAWINGS

The foregoing features and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
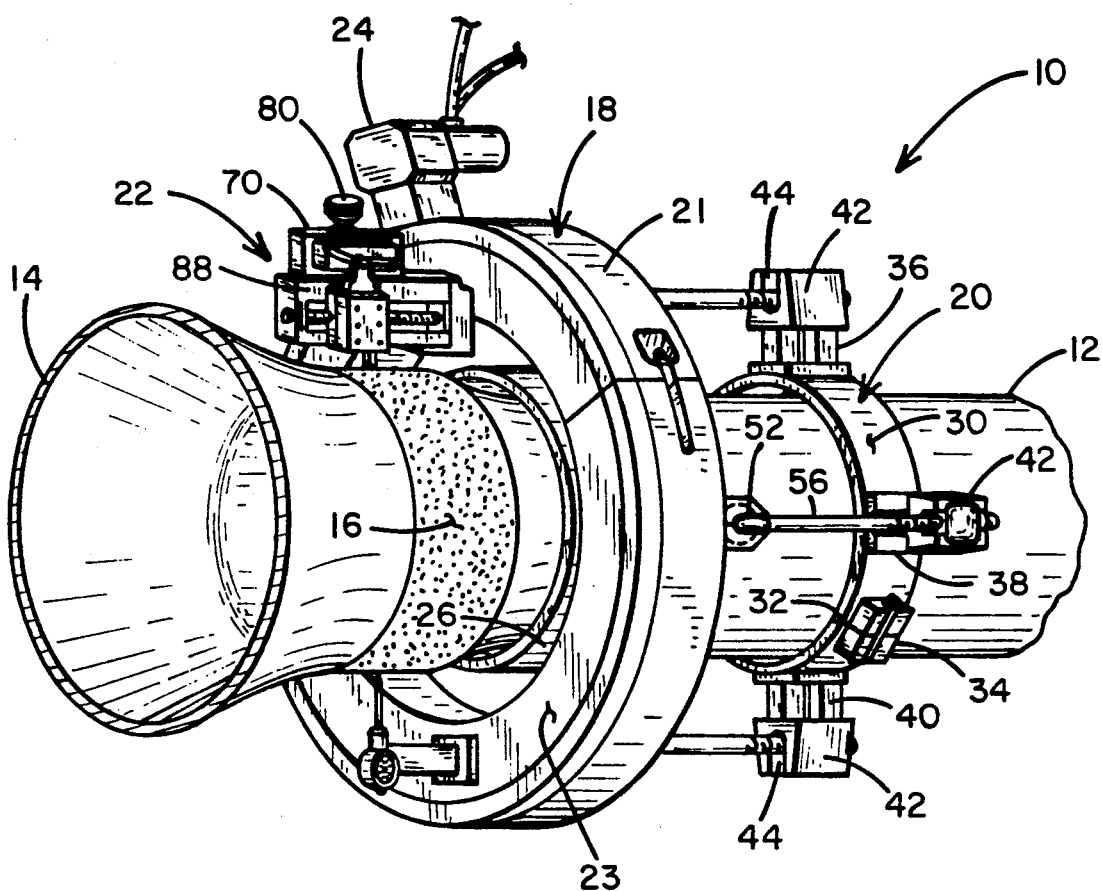
FIG. 1 is a perspective view of the invention when used to remove an overlay weld from a joint between a pipe and a flared nozzle.

Referring first to FIG. 1, the assembly for removing a weld overlay from the junction between a straight pipe section and a outwardly flared nozzle is indicated generally by numeral 10. The straight pipe section 12 is shown as joined to the flared nozzle 14 with the joint being covered by the weld overlay 16.

The apparatus of the present invention can be considered as being comprised of three separate mechanisms, namely, a split-ring clamshell 18, a clamshell positioning mechanism 20 and an axial and radial cutting bit translating device 22. The clamshell itself may be of the type shown in my earlier U.S. Pat. No. 4,739,685 and, as such, it includes an annular stationary member 21 which is appropriately centered relative to the pipe 12 and an annular rotatable member 23 driven by a suitable motor 24 to orbit the pipe 12. Because the internal construction of the split-ring clamshell mechanism 18 is fully described in the aforereferenced patent, it is deemed unnecessary to explain its construction and mode of operation herein.

Figure 3:
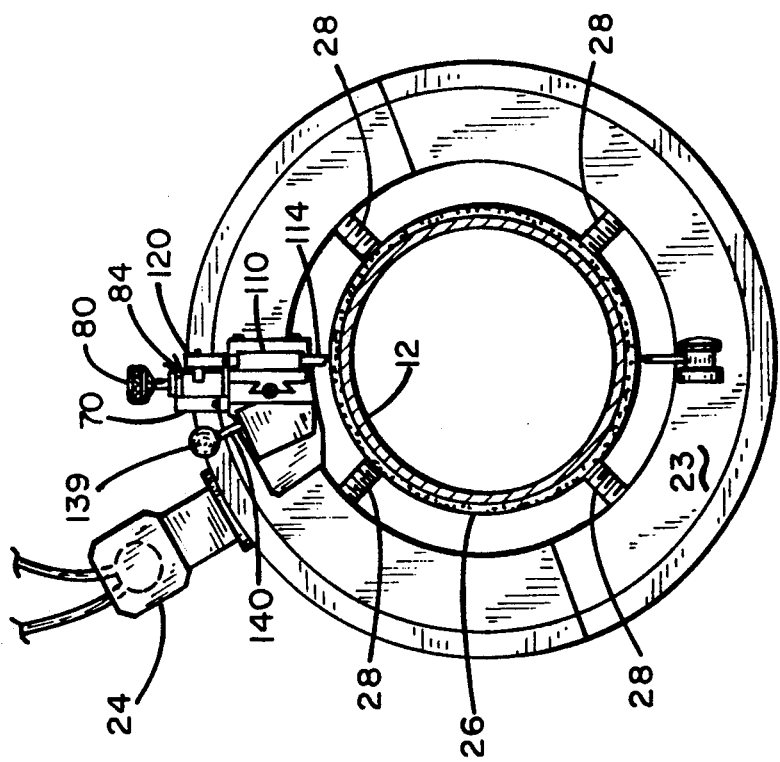
FIG. 3 is a cross-sectional view taken along the line 3—3 in FIG. 2.

As can be seen in FIGS. 1 and 3, a first cylindrical sleeve or collar 26 surrounds the pipe 12 and has an outer diameter which is greater than that of the pipe but less than that of the annular clamshell. A series of threaded set screws as at 28 (FIG. 3) pass through threaded bores formed in the collar 26 and the ends thereof abut the outer surface of the pipe 12. By appropriately rotating the set screws 28, the concentricity of the clamshell assembly 18 relative to the center line of the pipe 12 can be adjusted.

Figure 2:
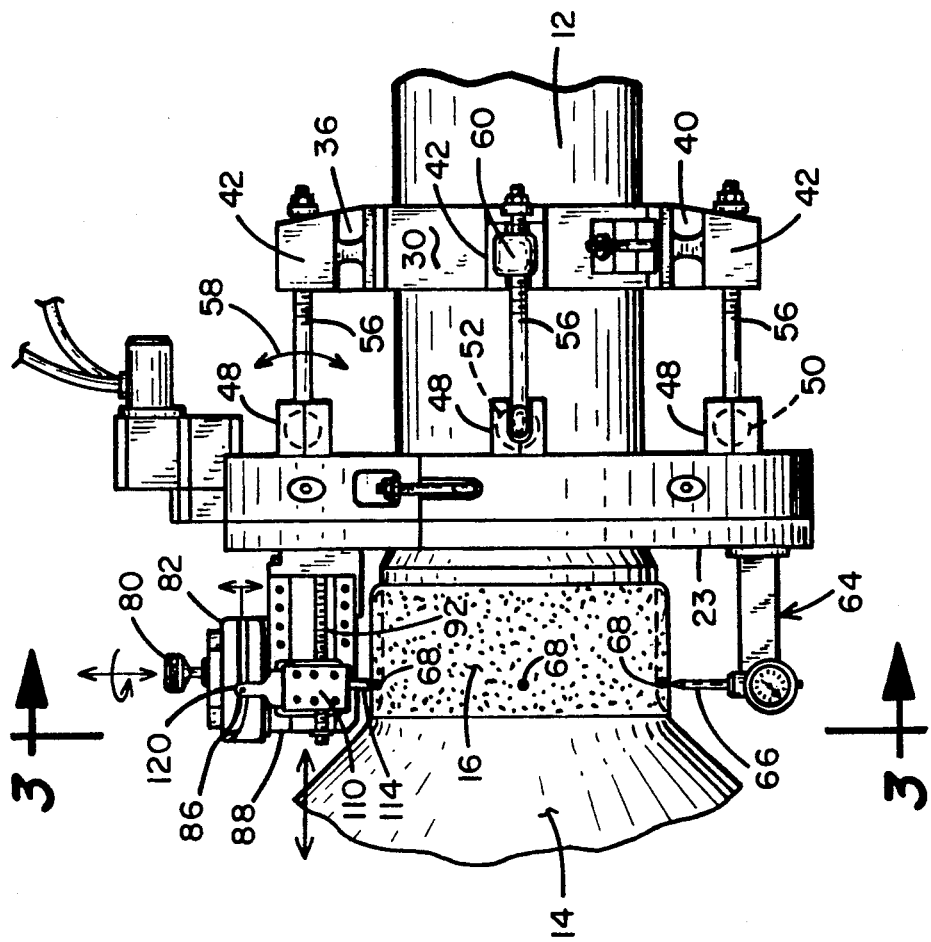
FIG. 2 is a partial, slightly enlarged, side view of the apparatus of FIG. 1.

Referring next to FIGS. 1 and 2, the apparatus for ensuring that the plane of the clamshell assembly 18 is precisely perpendicular to the pipe 12 will next be described. The positioning mechanism 20 comprises a second annular ring 30 which is thus split at 32 but which can be joined together by an appropriate clamp assembly 34 once the collar 30 is made to surround the pipe 12. Projecting radially at regularly spaced intervals along the circumference of the collar 30, e.g. every 90° are a plurality (four) of arms, only three of which 36, 38 and 40 can be seen. Affixed to the upper end of each of the arms is a socket 42 with a U-shaped channel 44 formed therein.

Figure 4:
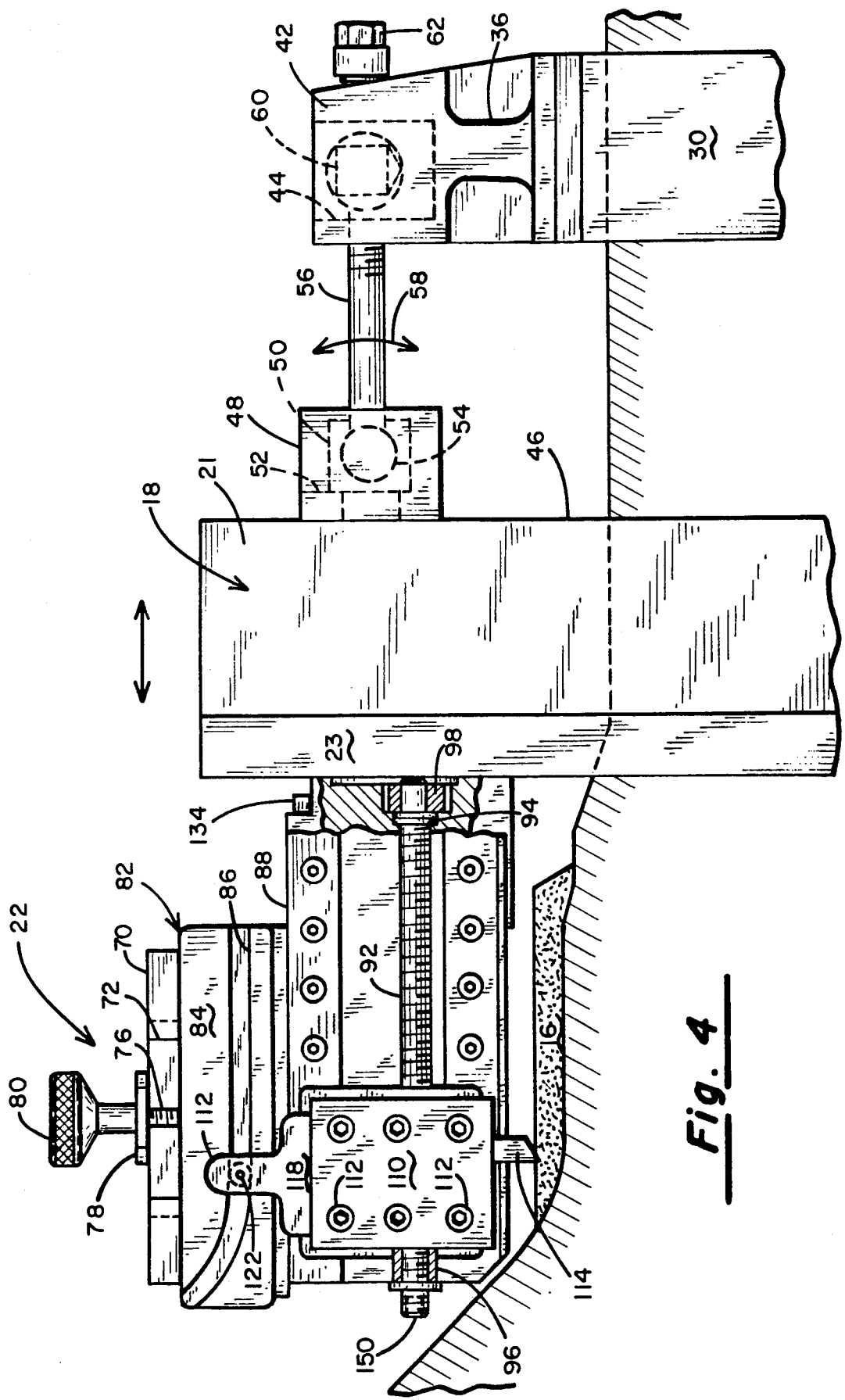
FIG. 4 is a somewhat enlarged partial side view of the invention.

Associated with each of the arms 36, 38, 40, etc., but rigidly affixed to the exterior side surface 46 of the stationary member 21 are gimbal blocks 48. The gimbal blocks 48 include a cavity 50, and a slot 52 is formed through the wall thickness thereof. The cavity 50 is designed to receive a spherical end piece 54 affixed to the end of a threaded rod 56. The slot 52 permits the rod 56 to be rotated 90 degrees from the position shown in FIG. 4 in the direction of the doubled-head arrow 58.

Threaded onto the rods 56 are threaded nuts 60 which are dimensioned to fit within the U-shaped channels 44 of the sockets 42, the dimensions of the nut and the channel or socket being such that the nuts are constrained from rotating when disposed in the channel.

Formed on the free end of the threaded rods 56 is a hex head 62 which is of a standard size and which can be engaged by a wrench. By appropriately rotating the threaded rods when their associated nuts are confined in the channels of the socket members, axial forces are applied to the clamshell, and by appropriate adjustment of the several threaded rods, the clamshell can be easily positioned to the point where it is perpendicular to the center line of the pipe to be refurbished.

To ease the repositioning, a feeler gauge, indicated generally by numeral 64 (FIG. 2), is attached to the rotatable portion 22 of the clamshell and the gauge includes a dial indicator 66. The dial indicator allows the user to "zero" to the center of a round surface. Generally, readings would be taken in four quadrants. This method allows the operator to adjust to the exact center of the pipe. Four points or dimples are located on the overlay and are used only for establishing the plane perpendicular to the center line of the pipe axis.

The clamshell positioning assembly 20 not only serves to ensure perpendicularity, but it also maintains stability of the clamshell during its use. That is to say, because the collar 30 is rigidly clamped to the pipe and because of the gimbal joints between the threaded rods 56 and the gimbal blocks 48, the clamshell 18 is constrained at 90 degree points about its circumference.

Having described the clamshell positioning mechanism, attention will next be directed to the constructional features of the cutting tool translating mechanism 22 of FIG. 1. As can best be seen in the enlarged views of FIGS. 4 and 5, the tool translating mechanism 22 comprises a stationary guide block 70 which projects perpendicularly from a side surface of the annular rotatable member 23 of the clamshell 18 and the guide block 70 includes a guide groove 72, preferably a dove-tail groove, which extends in the radial direction relative to the pipe on which the clamshell is mounted. Cooperating with the stationary guide block 70 is a movable guide block 74 having a dove-tail projection for extending into the guide groove 72 in the stationary guide block. Those skilled in the art can appreciate that the guide groove 72 could be formed in the moveable block 74 and the dove-tail projection on the fixed or stationary block 70 to achieve the desired sliding relation.

A manually operable lead screw 76 is journaled for rotation in a bearing plate 78 mounted on the fixed guide block and the lead screw is operatively coupled by way of a nut (not shown) so that turning the knob 80 allows reciprocal movement of the movable guide block 74 in the radial direction relative to the pipe.

Affixed to the movable guide block is a cam track 82 comprising a steel block 84 having an arcuate groove or track 86 formed inward from the exterior face thereof. The track 86 corresponds in shape to the arcuate surface of the weld overlay to be removed.

Figure 5:
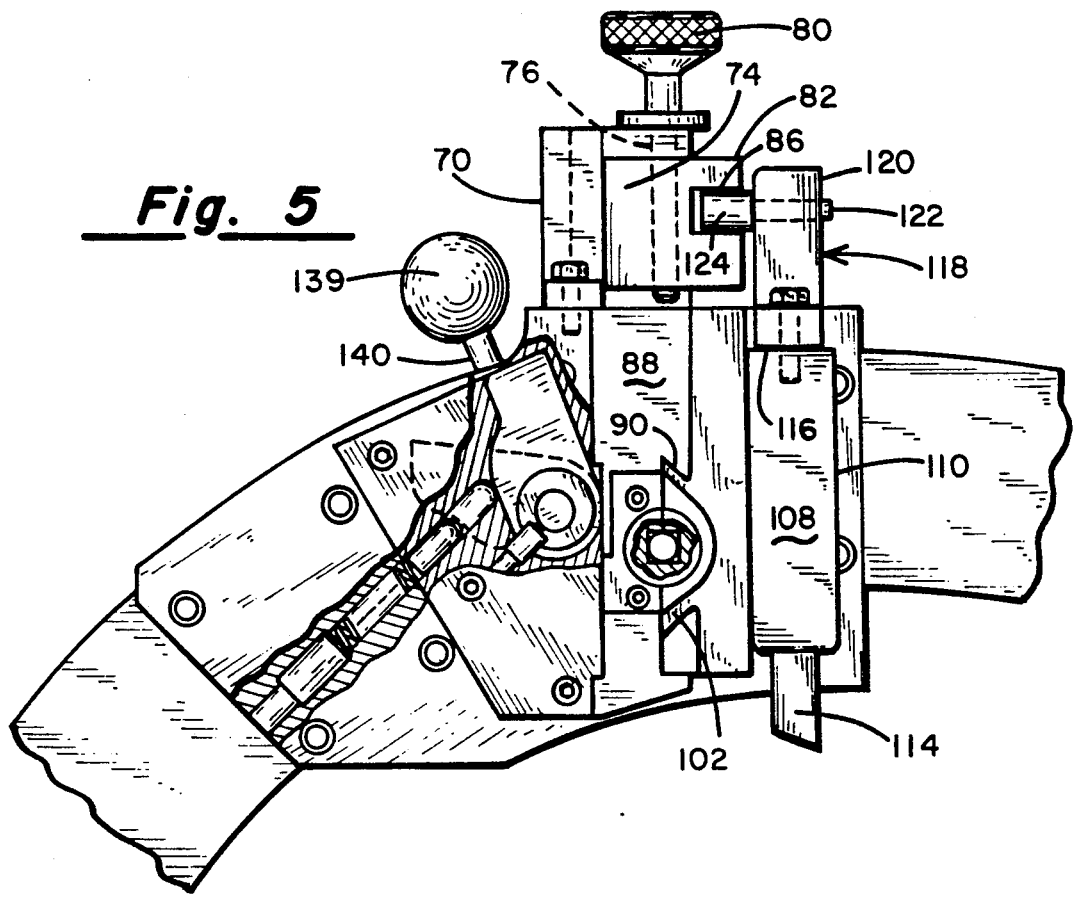
FIG. 5 is a partial end view showing the cutting bit positioning apparatus.

Also joined to the annular rotatable member 23 of the clamshell is a tool block translating means 88 which, as best seen in FIG. 5, includes a guide groove 90 in the form of a dove-tail which extends in the axial direction. A second lead screw 92 is journaled for rotation in the tool block translating means 88 by means of bearings 94 and 96. A gear 98 is affixed to one end of the lead screw 92 and constitutes a driven gear which is rotated only a predetermined incremental amount upon each rotation of the clamshell rotatable member 23. The manner in which this is accomplished will be explained in further detail below.

The lead screw 92 is operatively coupled by a nut 100 thereon to a tool block slide means 102 which has a projection 102 mating with the guide groove 90 formed in the tool block translating means 88. Thus, when the lead screw 92 is rotated, the engagement between the nut 100 and the tool block slide 102 causes axial movement of the tool block slide.

The tool block slide itself also includes a guide groove in the form of a dove-tail recess 104 which extends in the radial direction relative to the pipe on which the assembly is mounted. Fitted into that guide groove is a dove-tail projection 106 forming a part of a tool bit clamping means 108. The tool bit clamping means 108 further includes a cover plate 110 which, when held in place by screws 112, functions to tightly clamp a cutting bit 114 in place within a groove (not shown) formed in the block 108.

Affixed to the upper surface 116 of the tool bit clamping means 108 is a cam follower assembly 118 in the form of a radially projecting finger 120 having a pin 122 extending therethrough and serving as an axle for a roller 124 which is designed to closely fit within the confines of the cam track 86 so as to rotate therealong but without lateral displacement.

Figure 6:
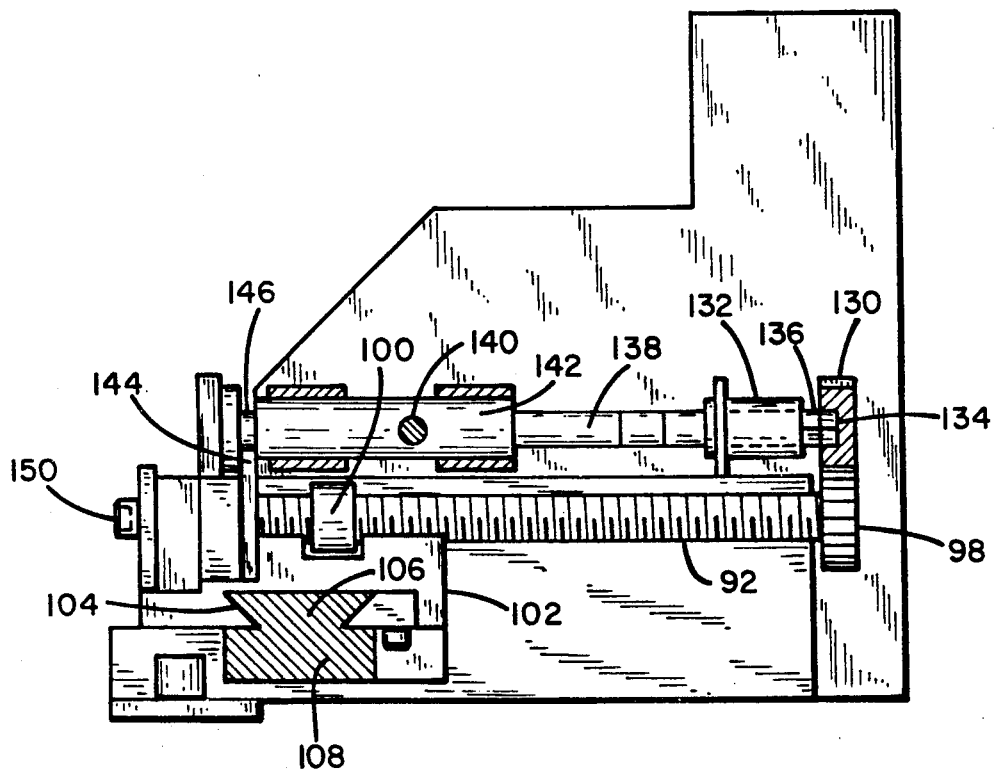
FIG. 6 is a partially sectioned top view showing the axial drive structure.

Referring next to the sectioned top view of FIG. 6, the drive gear 130 which meshes with the driven gear 98 is arranged to be driven through a one-way needle clutch 132 each time a feed cam 134 engages a star-wheel during the orbital motion of the clamshell member 23. The way in which this is accomplished is particularly set out in my earlier U.S. Pat. No. 4,739,685 and need not be repeated here. It is important to note, however, that the drive gear 130 has a square recess 134 formed therein for receiving the square end 136 of a shaft 138. In this figure, the gear and the shaft are shown disengaged from one another.

There are two ways in which the drive shaft 138 cam become disengaged from the drive gear 130. This can be accomplished by manually grasping a knob 139 (FIG. 3) attached by a post 140 to a shaft guide 142 and sliding the shaft to the left as viewed as FIG. 6. The drive gear 130 will also become disengaged from its drive shaft 138 when the tool translating assembly 22 reaches the end of its axial travel. Here, a trip pin 144 fitted into a notch 146 in the slide 142 becomes engaged by the tool block slide means 102 to move the pin 144 to the left a distance sufficient to allow the square end shaft 136 to pull out from its mating recess 134 in the gear 130. At this point, continued rotation of the clamshell will continue to rotate the shaft 138 but not the gear 130. Hence, no rotational motion will be imparted to the lead screw 92 via its associated driven gear 98.

OPERATION

In operation, the clamshell 18 is first clamped onto the pipe and accurately positioned so as to be coaxial with the pipe and also perpendicular to it through the use of the positioning mechanism 20 already described. Once the clamshell is properly positioned, the knob 80 is rotated to force the cutting tool 114 a short predetermined distance below the top of the weld overlay 16 to be removed. Now, when the motor 24 is made to drive the clamshell ring 23, upon each revolution thereof, the tool bit will be moved slightly in the axial direction by virtue of the coupling of the drive gear 130 to the driven gear 98 and attendant rotation of the lead screw 92.

The cutting bit removes an annular layer during each revolution. The removed material is more massive and does not tend to become air-borne.

The rotation of the lead screw 92 causes the nut 100 to move out in the axial direction and, in doing so, carries the tool block slide means 102 with it. The cam track member 84, however, remains stationary and as the tool block slide progresses outwardly away from the clamshell, the tool bit clamping means 108 slides in the radial groove 104 such that the tool bit 114 will, at all times, follow the contour established by the cam track 86. In this way, the tool bit 114 is able to track the arcuate contour of the nozzle 14.

When the tool bit 114 has progressed to the end of its axial travel, the tool block slide means 102 will engage the trip pin 144 to urge the shaft 138 to the point where the square end thereof 136 clears the squared recess in the drive gear 130. Thus, further run-out away from the clamshell is prevented. The operator may now use a special bit on a power hand drill which fits into a square recess 150 on the exposed end of the lead screw 92 to rotate that lead screw in the opposite direction, returning the tool block slide 102 to its rightmost or "home" position prior to making the next pass. Once the slide 102 has been moved to its "home" position, the operator may manipulate the knob 139 secured to shaft 140 to move the shaft 138 to the right to again engage the square end 136 of that shaft with the recess 134 of the gear 130.

The operator will again make an adjustment of the knob 80 to determine the depth-of-cut of the next pass of the tool 114 and this sequence is repeated, removing layer upon layer, until the overlay weld 16 is completely removed. The operator will typically move to a very low radiation (approximately 5 to 10 MR) area as the axial movement of the tool takes place. The equipment will be monitored by using mirrors and/or T.V. cameras. The operator then only returns to the site when a new depth-of-cut adjustment must be made.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Apparatus for removing the overlay weld material from an arcuate flared surface of a pipe nozzle, comprising:
   (a) clamshell means adapted to be concentrically mounted on a pipe whose nozzle overlay weld is to be removed, said clamshell means including an annular stationary member and an annular rotatable member encircling said pipe and means for driving said rotatable member relative to said stationary member around said pipe as a center;
   (b) a tool block for clamping a weld cutting tool, said tool block affixed to said rotatable member and being movable in the radial direction relative to said pipe in accordance with an axially extending arcuate profile; and
   (c) tool block translating means affixed to said rotatable member for imparting incremental movement of said tool block in the axial direction upon each rotation of said rotatable member, said tool block being simultaneously moved in the radial direction as determined by said axially extending arcuate profile.

2. The apparatus as in claim 1 and further including positioning means for setting said clamshell means precisely perpendicular to the longitudinal axis of said pipe.

3. The apparatus as in claim 2 wherein said positioning means comprises:
   (a) a split annular collar adapted to be clamped about said pipe proximate said annular stationary member of said clamshell means, said collar having a plurality of regularly spaced outwardly extending arms, each arm terminating in a U-shaped socket;
   (b) a plurality of gimbal blocks corresponding in number to said plurality of arms and affixed to said stationary member of said clamshell in general alignment with said arms, said gimbal blocks including a spherical recess therein;
   (c) a plurality of threaded rods, each having a ball member affixed to one end thereof, said ball member disposed in said spherical recesses of said gimbal blocks to provided limited pivotal movement and rotation of said threaded arms; and
   (d) a threaded nut screwed onto each of said threaded arms and dimensioned to fit into said U-shaped sockets on said arms whereby selective rotation of said threaded rods when said nuts are fitted into said sockets applies axially directed forces to said clamshell means.

4. The apparatus as in claim 3 and further including an indicating feeler probe affixed to said rotatable member of said clamshell for engaging markings formed on the surface of said weld overlay and providing a frame of reference when rotating said threaded rods.

5. The apparatus as in claim 1 wherein said axially extending arcuate profile comprises a cam track operatively coupled to said tool block translating means and said tool block further includes cam follower means affixed thereto, said cam follower engaging said cam track.

6. Apparatus for removing the overlay weld material from an arcuate surface of a pipe fitting, comprising:
   (a) clamshell means adapted to be concentrically mounted on a pipe whose fitting is to be treated, said clamshell means including an annular stationary member, an annular rotatable member and means for driving said rotatable member relative to said stationary member around said pipe as a center;
   (b) stationary guide block means affixed to said rotatable member for rotation therewith, said stationary guide block means projecting normally from a side surface of said rotatable member and including a guide groove extending in the radial direction relative to said pipe on which said clamshell means is mounted and a first lead screw journaled for rotation in said stationary guide block means with a longitudinal axis oriented in said radial direction;
   (c) a moveable guide block having a projection for extending into said guide groove in said stationary guide block and operatively coupled to said first lead screw for reciprocal movement in the direction of said guide groove as said first lead screw is rotated, said movable guide block further including a cam track having an arcuate shape corresponding to said arcuate surface of said pipe fitting to be treated;
   (d) tool block translating means joined to said rotatable member of said clamshell means and including an axial extending guide groove and a second lead screw journaled for rotation therein and extending parallel to said axial extending guide groove;
   (e) tool block slide means having a projection slidably received in said axial extending guide groove and operatively coupled to said second lead screw whereby rotation of said second lead screw translates said tool block slide means, said tool block slide means further including a radial guide groove; and
   (f) tool bit clamping means for clamping a cutting bit therein, said tool bit clamping means having a projection insertable into said radial guide groove of said tool block slide means and a cam follower joined thereto and engaging said cam track whereby axial movement of said tool block slide means causes said cutting bit to follow said arcuate surface and rotation of said first lead screw determines the depth of cut.

7. The apparatus as in claim 6 and further including positioning means for setting said clamshell means precisely perpendicular to the longitudinal axis of said pipe.

8. The apparatus as in claim 7 wherein said positioning means comprises:
   (a) a split annular collar adapted to be clamped about said pipe proximate said annular stationary member of said clamshell means, said collar having a plurality of regularly spaced outwardly extending arms, each arm terminating in a U-shaped socket;
   (b) a plurality of gimbal blocks corresponding in number to said plurality of arms and affixed to said stationary member of said clamshell in general alignment with said arms, said gimbal blocks including a spherical recess therein;
   (c) a plurality of threaded rods, each having a ball member affixed to one end thereof, said ball member disposed in said spherical recesses of said gimbal blocks to provided limited pivotal movement and rotation of said threaded arms; and
   (d) a threaded nut screwed onto each of said threaded arms and dimensioned to fit into said U-shaped sockets on said arms whereby selective rotation of said threaded rods when said nuts are fitted into said sockets applies axially directed forces to said clamshell means.

9. The apparatus as in claim 8 and further including a dial indicator gauge means affixed to said rotatable member of said clamshell, said dial indicator gauge means including a feeler probe for engaging markings formed on the surface of said weld overlay for providing a frame of reference when rotating said threaded rods.

10. The apparatus as in claim 6 wherein said first lead screw is manually rotated and said second lead screw is automatically rotated an incremental amount upon each orbit of said rotatable member of said clamshell means.

11. The apparatus as in claim 10 and further including means for automatically inhibiting further rotation of said second lead screw when said tool block translating means is moved a predetermined distance in the axial direction relative to said pipe.

12. Apparatus for removing the overlay weld material from an arcuate surface of a pipe fitting, comprising:
   (a) clamshell means adapted to be concentrically mounted on a pipe whose fitting is to be treated, said clamshell means including an annular stationary member, an annular rotatable member and means for driving said rotatable member relative to said stationary member around said pipe as a center;
   (b) stationary guide block means affixed to said rotatable member for rotation therewith, said stationary guide block means projecting normally from a side surface of said rotatable member and including a guide projection extending in the radial direction relative to said pipe on which said clamshell means is mounted and a first lead screw journaled for rotation in said stationary guide block means with a longitudinal axis oriented in said radial direction;
   (c) a moveable guide block having a guide groove for receiving said guide projection therein and operatively coupled to said first lead screw for reciprocal movement in the direction of said guide projection as said first lead screw is rotated, said movable guide block further including a cam track having an arcuate shape corresponding to said arcuate surface of said pipe fitting to be treated;
   (d) tool block translating means affixed to said rotatable member of said clamshell means and including an axial extending projection and a second lead screw journaled for rotation therein and extending parallel to said axial extending projection;
   (e) tool block slide means having a guide groove for slidably receiving said axial extending guide projection and operatively coupled to said second lead screw whereby rotation of said second lead screw translates said tool block slide means, said tool block slide means further including a radial guide projection; and
   (f) tool bit clamping means for clamping a cutting bit therein, said tool bit clamping means having a guide groove formed therein in which said guide projection of said tool block slide means is received and a cam follower joined thereto and engaging said cam track whereby axial movement of said tool block slide means causes said cutting bit to follow said arcuate surface and rotation of said first lead screw determines the depth of cut.

13. The apparatus as in claim 12 and further including positioning means for setting said clamshell means precisely perpendicular to the longitudinal axis of said pipe.

14. The apparatus as in claim 13 wherein said positioning means comprises:
   (a) a split annular collar adapted to be clamped about said pipe proximate said annular stationary member of said clamshell means, said collar having a plurality of regularly spaced outwardly extending arms, each arm terminating in a U-shaped socket;
   (b) a plurality of gimbal blocks corresponding in number to said plurality of arms and affixed to said stationary member of said clamshell in general alignment with said arms, said gimbal blocks including a spherical recess therein;
   (c) a plurality of threaded rods, each having a ball member affixed to one end thereof, said ball member disposed in said spherical recesses of said gimbal blocks to provided limited pivotal movement and rotation of said threaded arms; and
   (d) a threaded nut screwed onto each of said threaded arms and dimensioned to fit into said U-shaped sockets on said arms whereby selective rotation of said threaded rods when said nuts are fitted into said sockets applies axially directed forces to said clamshell means.

15. The apparatus as in claim 14 and further including a dial indicator gauge means affixed to said rotatable member of said clamshell, said feeler gauge including a feeler probe for engaging markings formed on the surface of said weld overlay for providing a frame of reference when rotating said threaded rods.

16. The apparatus as in claim 12 wherein said first lead screw is manually rotated and said second lead screw is automatically rotated an incremental amount upon each rotation of said rotatable member of said clamshell means.

17. The apparatus as in claim 16 and further including means for automatically inhibiting further rotation of said second lead screw when said tool block translating means is moved a predetermined distance in the axial direction relative to said pipe.

* * * * *